US008533298B2

(12) United States Patent  
Takahashi et al.

(10) Patent No.: US 8,533,298 B2  
(45) Date of Patent: Sep. 10, 2013

(54) BOX DATA MANAGEMENT APPARATUS AND METHOD

(75) Inventors: Kenichi Takahashi, Osaka (JP); Kaitaku Ozawa, Amagasaki (JP); Toshiya Shozaki, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1146 days.

(21) Appl. No.: 11/164,272

(22) Filed: Nov. 16, 2005

(65) Prior Publication Data  
US 2007/0044040 A1 Feb. 22, 2007

(30) Foreign Application Priority Data  
Aug. 8, 2005 (JP) ................ P2005-229239

(51) Int. Cl.  
*G06F 15/177* (2006.01)

(52) U.S. Cl.  
USPC .......... 709/220; 709/219; 709/223; 358/1.15; 358/1.16; 705/34

(58) Field of Classification Search  
USPC ................ 709/220; 358/1.13–1.16  
See application file for complete search history.

(56) References Cited

U.S. PATENT DOCUMENTS

| | | | |
|---|---|---|---|
| 5,682,510 A * | 10/1997 | Zimmerman et al. | ........ 715/843 |
| 6,308,173 B1 | 10/2001 | Glasser et al. | |
| 6,424,429 B1 | 7/2002 | Takahashi et al. | |
| 6,559,967 B1 | 5/2003 | Akiba et al. | |
| 6,559,979 B1 | 5/2003 | Ryan | |
| 6,751,780 B1 | 6/2004 | Neff et al. | |
| 7,386,586 B1 * | 6/2008 | Headley et al. | ............... 709/202 |
| 2002/0154335 A1 * | 10/2002 | Matoba et al. | ............... 358/1.15 |
| 2003/0142348 A1 * | 7/2003 | Hiramatsu et al. | ........... 358/1.15 |
| 2004/0190042 A1 * | 9/2004 | Ferlitsch et al. | ............. 358/1.15 |
| 2004/0260696 A1 * | 12/2004 | Matsuoka et al. | ................. 707/5 |
| 2005/0108649 A1 * | 5/2005 | Ueda | ............................. 715/760 |
| 2005/0264830 A1 * | 12/2005 | Une et al. | ...................... 358/1.1 |
| 2006/0007469 A1 * | 1/2006 | Uruma | ......................... 358/1.14 |
| 2006/0050291 A1 * | 3/2006 | Morikawa et al. | ........... 358/1.13 |

FOREIGN PATENT DOCUMENTS

| | | |
|---|---|---|
| JP | 2000-122766 | 4/2000 |
| JP | 2005-39411 | 2/2005 |

* cited by examiner

*Primary Examiner* — Hua Fan  
(74) *Attorney, Agent, or Firm* — Buchanan Ingersoll & Rooney PC

(57) ABSTRACT

A box data management apparatus extracts box data from a plurality of devices, connected to a network, to enable display of a list of the box data. An operational parameter collection part in the box data management apparatus collects operational parameters as information for processing the box data in the devices. A box data processing part in the box data management apparatus extracts and displays a device and an operational parameter which are capable of processing each of the box data based upon the operational parameters. Therefore, after display of the box data in a list without division by the devices, operational parameters capable of processing selected box data are displayed, thereby enabling improvement in operability and convenience for the user.

16 Claims, 23 Drawing Sheets

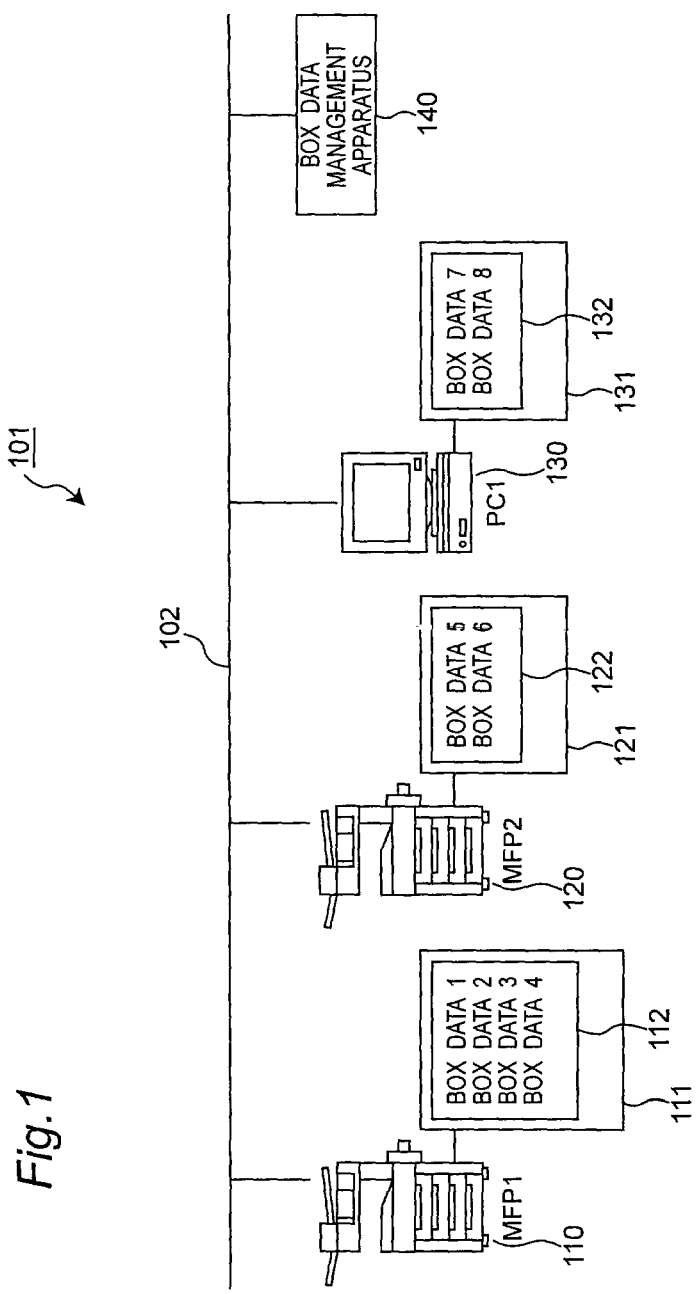

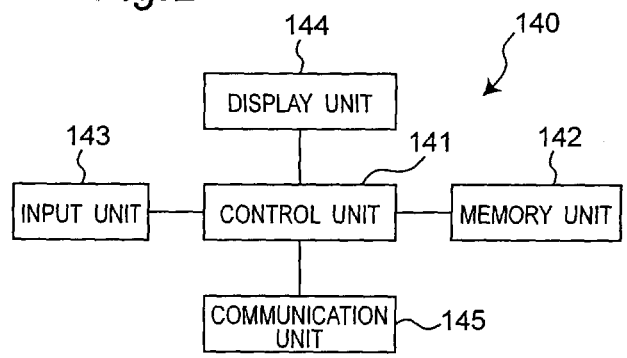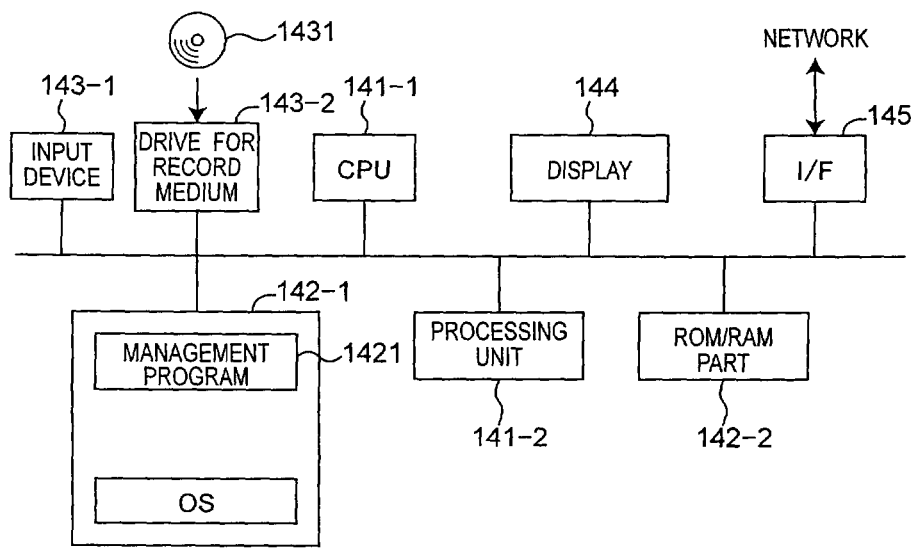

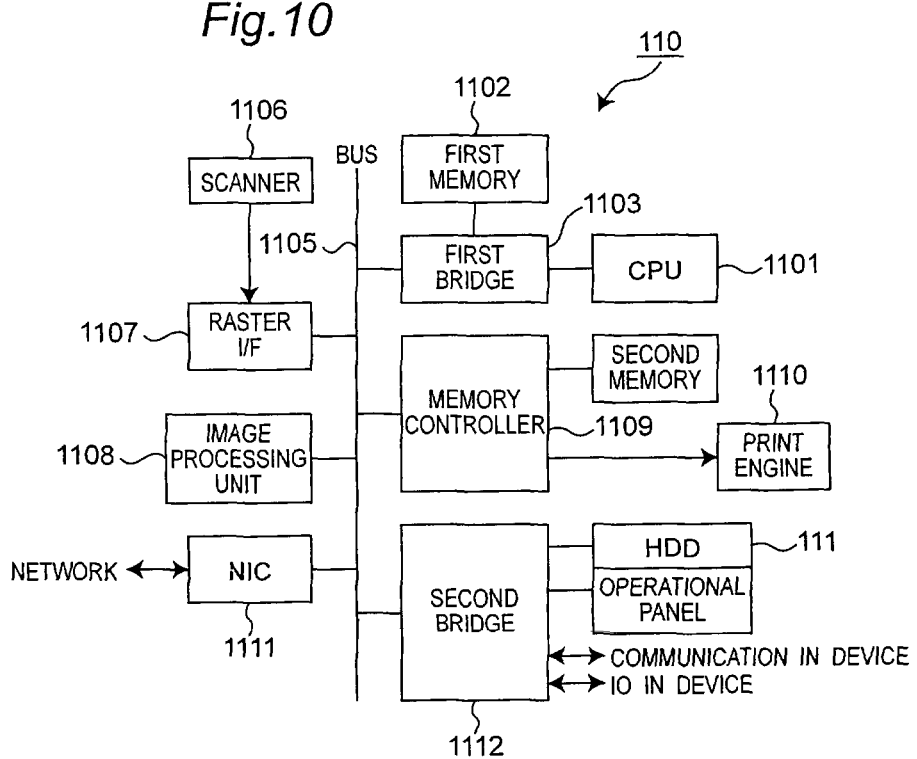

Fig.12

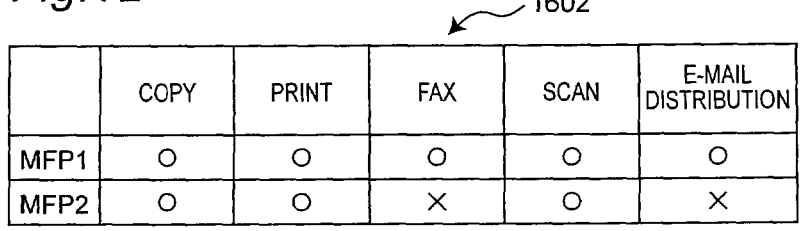

| | COPY | PRINT | FAX | SCAN | E-MAIL DISTRIBUTION |
|---|---|---|---|---|---|
| MFP1 | ○ | ○ | ○ | ○ | ○ |
| MFP2 | ○ | ○ | × | ○ | × |

Fig.13

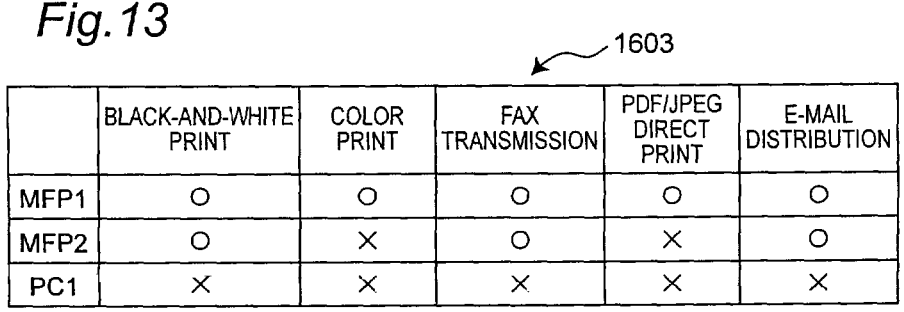

| | BLACK-AND-WHITE PRINT | COLOR PRINT | FAX TRANSMISSION | PDF/JPEG DIRECT PRINT | E-MAIL DISTRIBUTION |
|---|---|---|---|---|---|
| MFP1 | ○ | ○ | ○ | ○ | ○ |
| MFP2 | ○ | × | ○ | × | ○ |
| PC1 | × | × | × | × | × |

Fig.14

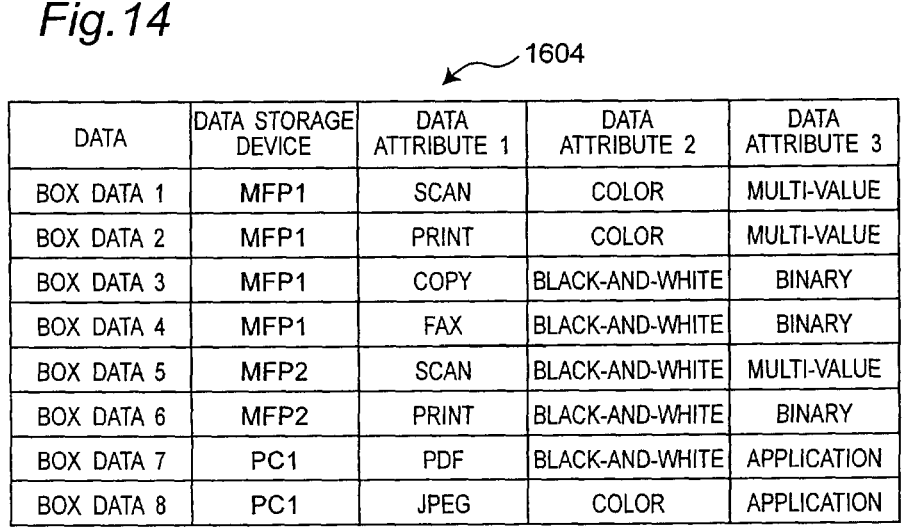

| DATA | DATA STORAGE DEVICE | DATA ATTRIBUTE 1 | DATA ATTRIBUTE 2 | DATA ATTRIBUTE 3 |
|---|---|---|---|---|
| BOX DATA 1 | MFP1 | SCAN | COLOR | MULTI-VALUE |
| BOX DATA 2 | MFP1 | PRINT | COLOR | MULTI-VALUE |
| BOX DATA 3 | MFP1 | COPY | BLACK-AND-WHITE | BINARY |
| BOX DATA 4 | MFP1 | FAX | BLACK-AND-WHITE | BINARY |
| BOX DATA 5 | MFP2 | SCAN | BLACK-AND-WHITE | MULTI-VALUE |
| BOX DATA 6 | MFP2 | PRINT | BLACK-AND-WHITE | BINARY |
| BOX DATA 7 | PC1 | PDF | BLACK-AND-WHITE | APPLICATION |
| BOX DATA 8 | PC1 | JPEG | COLOR | APPLICATION |

Fig.16

|  | MFP1 | | | MFP2 | | | | PC1 | |
| --- | --- | --- | --- | --- | --- | --- | --- | --- | --- |
|  | PRINT | FAX TRANSMISSION | E-MAIL DISTRIBUTION | PRINT | FAX TRANSMISSION | E-MAIL DISTRIBUTION | EDITION | FAX TRANSMISSION | E-MAIL TRANSMISSION |
| BOX DATA 1 | 10 |  | 5 |  |  |  |  |  |  |
| BOX DATA 2 | 20 |  |  |  |  |  |  |  |  |
| BOX DATA 3 | 3 | 2 | 10 |  |  |  |  |  |  |
| BOX DATA 4 |  | 5 | 3 |  |  |  |  |  |  |
| BOX DATA 5 |  |  | 10 | 2 |  |  |  |  |  |
| BOX DATA 6 |  |  | 10 | 2 |  |  |  |  |  |
| BOX DATA 7 | 10 |  |  |  |  |  |  |  | 5 |
| BOX DATA 8 |  | 10 |  |  |  |  |  |  | 5 |

| DATA | OUTPUT DEVICE | FIRST HIERARCHY | | | |
|---|---|---|---|---|---|
| BOX DATA 1 | MFP1 | PRINT SETTING 1 | PRINT SETTING 2 | PRINT SETTING 3 | DESTINATION 1 | DESTINATION 2 | DESTINATION 3 |
| BOX DATA 2 | MFP1 | PRINT SETTING 1 | PRINT SETTING 2 | PRINT SETTING 3 | DESTINATION 1 | DESTINATION 2 | DESTINATION 3 |
| BOX DATA 3 | MFP1 | PRINT SETTING 1 | PRINT SETTING 2 | PRINT SETTING 3 | DESTINATION 1 | DESTINATION 2 | DESTINATION 3 |
| BOX DATA 4 | MFP1 | PRINT SETTING 1 | PRINT SETTING 2 | PRINT SETTING 3 | DESTINATION 1 | DESTINATION 2 | DESTINATION 3 |
| BOX DATA 5 | MFP2 | PRINT SETTING 4 | PRINT SETTING 5 | PRINT SETTING 6 | |
| BOX DATA 6 | MFP2 | PRINT SETTING 4 | PRINT SETTING 5 | PRINT SETTING 6 | |
| BOX DATA 7 | PC1 | PRINTER 1 | MAIL TRANSMISSION | EDITION | |
| BOX DATA 8 | PC1 | PRINTER 1 | MAIL TRANSMISSION | EDITION | |

1607

1610

BOX DATA MANAGEMENT APPARATUS AND METHOD

This application is based on an application No. 2005-229239 filed on Aug. 8, 2005 in Japan, the contents of which is hereby incorporated by reference.

BACKGROUND OF THE INVENTION

1. Field of the Invention

The present invention relates to a box data management apparatus and method, which manage box data corresponding to image data including a document in a constitution where a plurality of devices for handling the image data, such as multi-functional peripherals (MFP) and a printer, are connected via a network.

2. Description of the Related Art

A general mode has hitherto been that a data storage region for private use, such as a personal box or holder, is provided for each of devices such as MFP (multi-functional peripherals) and a personal computer, and according to need, each of the devices is logged in to access the data storage region for private use. It is to be noted that the MFP is an apparatus called a composite apparatus or the like, into which functions such as copying, network printing, scanning, faxing and/or document serving are integrated.

In such a mode, it is possible to access the data storage region only by accessing and logging in each of the devices as thus described, which is a troublesome operation. This mode further has problems including having to keep track of which document data were stored in which device, or the like.

In order to solve these problems, a technique is recently proposed where personal boxes regarding one user which are present on a network is searched by logging in one device, and then all extracted personal boxes are virtually displayed in a list, thereby enabling access to the personal boxes without consciousness of devices on the network (See Japanese Unexamined Patent Publication No. 2005-39411).

In such a state of virtually displaying the extracted boxes, it is possible to access a document by the simple operation. However, it is impossible to keep track of which operation is executable on the accessed document when an operation such as printing, transferring, editing, or binding is to be executed on the accessed document, due to a function of a device in which the document is stored, a device difference between a normally frequently used home MFP and the device in which the document is stored, or some other reasons, etc. There is therefore a problem in that, even when details of an operation are instructed after selection of a document, the instructed operation is impracticable, or a device different from an intended device is automatically selected.

SUMMARY OF THE INVENTION

The present invention is made to solve such problems, and has an object to provide a box data management apparatus and method which are capable of improving operationality and convenience for the user.

In order to achieve the above object, the present invention is constituted as follows.

A box data management apparatus in a first aspect of the present invention is an apparatus which extracts box data from a plurality of devices having storage boxes each of which stores the box data and connected to a network, and enables to display a list of the box data without dividing the extracted box data on a basis of the devices and the storage boxes, wherein the box data management apparatus comprises:

an operational parameter collection part configured to collect operational parameters which correspond to information for making the box data process with the devices; and a box data processing part configured to extract the devices and the operational parameters for each of the box data which are capable of processing the box data on a basis of the collected operational parameters, and enable display of the extracted devices and operational parameters.

The box data management apparatus may be constituted to further comprise a display processing part configured to have an information acquirement section and a box data search section which are configured to acquire storage related information showing a relation between the box data and an original storage device which is the device storing the concerned box data, and the display processing part configured to display the list of the box data; and the box data processing part may be constituted to have a selection section configured to enable selection of desired box data from the box data displayed in the list, and an extraction section configured to extract and display the operational parameters for the selected desired box data.

The box data processing part may be constituted to further have an execution instruction section configured to make the device execute processing on box data in accordance with an operational parameter selected from the operational parameters extracted and displayed by the extraction section.

The box data management apparatus may be constituted to further comprise a history display control part configured to acquire processing history information which shows a processing history of the box data for each of the devices, and configured to control display of the operational parameters based upon the processing history information.

The selection section may be constituted to further selectably display the devices which are capable of processing the box data displayed in the list on a basis of the storage related information; and by selection from the devices, the box data processing part may be constituted to display box data which can be processed by a selected device in a different manner from the other box data displayed in the list.

The selection section may be constituted to be capable of selecting a plurality of box data from the box data displayed in the list, and the extraction section may be constituted to extract and display an operational parameter common among the operational parameters extracted from the plurality of box data.

A box data management method in a second aspect of the present invention is to comprise:

extracting box data from a plurality of devices having storage boxes each of which stores the box data;

displaying a list of the box data without dividing the extracted box data on a basis of the devices and the storage boxes;

collecting operational parameters which correspond to information for processing the box data; and extracting operational parameters and devices which are capable of processing the box data based upon the collected operational parameters every the box data.

In the second aspect, it is also possible that box data which is able to be processed by a device selected from displayed devices is displayed in a different manner from the other box data in the displayed list of the box data.

In the second aspect, it is also possible that the extracted devices for the box data selected from the box data displayed in the list are displayed and the extracted operational parameters for the box data are hierarchically displayed.

In the second aspect, it is also possible that a processing history of the box data is acquired for each of the devices, and order of display of the operational parameters to be displayed is controlled in accordance with frequency in use of the operational parameters based upon the processing history.

In the second aspect, it is also possible that, upon selection of a plurality of box data from the box data displayed in the list, an operational parameter common among the selected plurality of box data is displayed.

In the second aspect, it is also possible that the device is made to execute an operational parameter selected from the displayed operational parameters.

According to the box data management apparatus in the first aspect of the present invention and the box data management method in the second aspect of the present invention, the box data stored in the storage boxes provided in a plurality of devices are read from the storage boxes, and the read box data are displayed without division by the devices and the storage boxes, namely seamlessly displayed. It is therefore possible to access all box data stored in desired storage boxes without awareness of the plurality of devices present on a network. Further, the operational parameter collection part and the box data processing part are provided so as to display a device and an operational parameter which are capable of processing each of the box data. It is therefore possible at the time of executing an operation on box data to display an operational parameter(s) corresponding to a device most suitable for processing the box data, such as a device in which the box data is stored, a device which has processed the box data in the past, or a device most convenient for the user. Accordingly, the conventional problem of being unable to keep track of details of an operation executable on selected data can be solved, thereby allowing the user to recognize easily an operation executable on box data so as to improve the operationality for the user.

With the selection section and the extraction section provided in the apparatus, it is possible at the time of operating box data selected by the user to display an operational parameter(s) showing a function(s) capable of processing the selected box data. This allows the user to easily keep track of a function executable on the selected box data so as to improve the operationality for the user.

With the history display control part provided in the apparatus, it is possible to consider a processing history of box data. This allows execution of more appropriate processing on the box data and efficient selection of an operational parameter. Further, since the user has an experience to execute the operation in the past, it is possible to improve the operationality for the user.

When a plurality of box data are selected, an operational parameter(s) common among these box data is (are) displayed. This allows each of the box data to be processed when any of the displayed operational parameters is selected. Therefore, the user has no need to consider whether or not the selected box data are processable, which contributes to improvement in operataionality.

BRIEF DESCRIPTION OF THE DRAWINGS

FIG. 1 is a view showing a constitution of a data processing system including a box data management apparatus in an embodiment of the present invention.

FIG. 2 is a block diagram showing a schematic constitution of the box data management apparatus shown in FIG. 1.

FIG. 3 is a block diagram showing constituent parts, connected to a CPU, of the control unit shown in FIG. 2.

FIG. 10 is a block diagram showing the constitution of the MFP shown in FIG. 1.

FIG. 11 is a view showing storage related information to be used in the box data management apparatus shown in FIG. 1.

FIG. 12 is a view showing user authority information to be used in the box data management apparatus shown in FIG. 1.

FIG. 13 is a view showing device function information to be used in the box data management apparatus shown in FIG. 1.

FIG. 14 is a view showing box data attribute information to be used in the box data management apparatus shown in FIG. 1.

FIG. 16 is a view showing processing history information to be used in the box data management apparatus in FIG. 1.

FIG. 17 is a view showing first hierarchical information to be used in the box data management apparatus in FIG. 1.

DETAILED DESCRIPTION OF THE PREFERRED EMBODIMENTS

Figure 4:
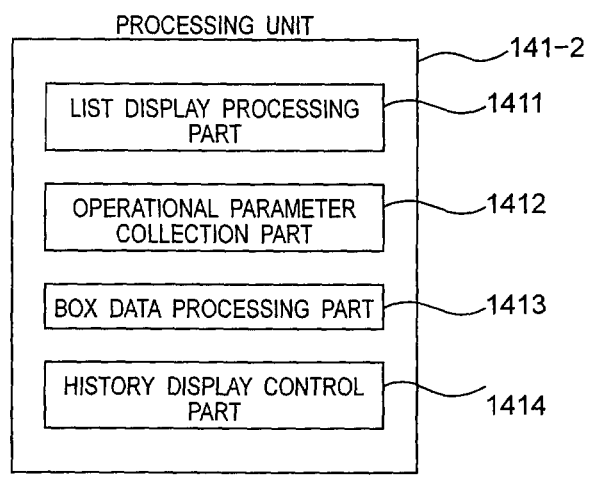
FIG. 4 is a block diagram showing the constitution of the processing unit shown in FIG. 3.

Below, a box data management apparatus and method as embodiments of the present invention are described with reference to drawings. It is to be noted that the box data management method is executed with the box data management apparatus. Further, in each drawing, the same or equivalent component parts are designated by the same reference numerals, respectively.

Also, in this specification and claims of the present application, "box" means a data storage region for private use such as a holder in a storage means, so "box data" means data like a file stored in the box.

FIG. 1 shows a data processing system 101 having a box data management device 140 of the present embodiment. In the data processing system 101, a plurality of devices 110, 120, 130 and a box data management apparatus 140 are connected to a network 102. In the present embodiment, each of the devices 110 and 120 is an apparatus called multifunctional peripherals (MFP) or the like. In the MFP, functions such as copying, network printing, scanning, faxing or document serving are integrated in a single machine. Hereinafter, the device 110 may be referred to as a "first MFP 110" (and may be referred to as "MFP1" in the figures), and the device 120 may be referred to as a "second MFP 120" (and may be referred to as "MFP2" in the figures). Further, the device 130 is a personal computer, and may hereinafter be referred to as a "PC 130" (and may be referred to as "PC1" in the figures). It is to be noted that the kinds, the number, etc. of the devices constituting the data processing system 101 are not limited to the present embodiment.

Although the box data management apparatus 140 is constituted as an independent device on the network 102 in the present embodiment, another constitution is also possible where below-described functions and operation of the box data management apparatus 140 is included and executed in any one of the devices 110, 120 and 130.

The first MFP 110, the second MFP 120 and the PC 130 respectively have memory units 111, 121 and 131, each of which is capable of storing image data for each user, namely by individualizing the data, the data including document data that consists of character strings. These memory units 111, 121 and 131 are composed for example of a hard disc (HDD). In the present example, for example, storage boxes 112, 122 and 132 for an identical user, with an identical name given thereto, are distributed and stored respectively in the memory unit 111 of the first MFP 110, the memory unit 121 of the second MFP 120 and the memory unit 131 of the PC 130. Box data 1 to 4 are stored in the storage box 112, box data 5 and 6 are stored in the storage box 122, and box data 7 and 8 are stored in the storage box 132. It is to be noted that, hereinafter, these box data may be generically referred to as "box data 20". The box data 20 corresponds to the above-mentioned image data.

With the first MFP 110 taken as an example, the function of the first MFP 110 is described showing a block diagram of control inside the MFP in FIG. 10. It is to be noted that the second MFP 120 has the same constitution and function as those of the first MFP 110. Hence a description of the second MFP 120 is omitted.

A CPU (central processing unit) 1101 and a first memory 1102 are connected to a bus 1105 through a first bridge 1103. Devices necessary for each data processing are connected to the bus 1105.

Image data read with a scanner 1106 is transmitted to a first memory 1102 as a main memory through a raster I/F part 1107 via the bus 1105 and the first bridge 1103. The image data transmitted to the first memory 1102 is transmitted to an image processing unit 1108 via the bus 1105 to be subjected to necessary image processing, and then returned to the first memory 1102. Thereafter, the image data is transmitted to a print engine 1110 through a memory controller 1109 and printed on a recording paper. The first MFP 110 is connected to the network 102 via an NIC 1111, and print data or the like is received via the NIC 1111.

In the case of printing, print data is transmitted to the first memory 1102 via the NIC 1111. The transmitted data is read with the CPU 1101 and then written as printable bit map data on the first memory 1102.

The created bit map data is processed in the image processing unit 1108, and transmitted as print data to the first memory 1102. Thereafter, the data is transmitted to the print engine 1110 via the memory controller 1109.

The box data 20 is stored into the memory unit 111 connected to the bus 1105 via the second bridge 1112.

Next, the box data management apparatus 140 is described.

The box data management apparatus 140 is an apparatus connected to the network 102. The apparatus 140 extracts desired box data 20 from the respective memory units 111, 121 and 131 of the first MFP 110, the second MFP 120 and the PC 130. Also the apparatus 140 displays the extracted box data 20 in a list in a seamless state. Namely, the box data 20 are displayed in a list without division by the devices 110, 120 and 130 and the storage boxes 112, 122 and 132, as if present on one virtual holder. Further, the box data management apparatus 140 is an apparatus where devices and functions capable of processing each of the box data 20 displayed in the list can be displayed. It should be noted that the functions capable of processing the box data 20 correspond to later described operational parameters.

When broadly classified, the box data management apparatus 140 as thus described comprises a control unit 141, a memory unit 142, an input unit 143, a display unit 144 and a communication unit 145, as shown in FIG. 2. Although a box data management operation is described below as an operation as well as function of the box data management apparatus 140, this description of the management operation can also be read as a description of a box data management program stored into the memory unit 142.

A constitution in the case of realizing the control unit 141 shown in FIG. 2 with the use of a CPU (central processing unit) is shown in FIG. 3. In FIG. 3, those connected to a CPU 141-1 are: a processing unit 141-2; a hard disc 142-1 and a ROM/RAM part 142-2 which correspond to the memory unit 142; an input device 143-1 and a drive 143-2 for record medium, which correspond to the input unit 143, a display 144 which corresponds to the display unit, and a network I/F 145 which corresponds to the communication unit. In the present embodiment, the input apparatus 143-1 includes a so-called mouse as a pointing device.

As shown in FIG. 4, the processing unit 141-2 is divided by function into a list display processing part 1411, an operational parameter collection part 1412 and a box data processing part 1413, and can further comprise a history display control part 1414.

Figure 5:
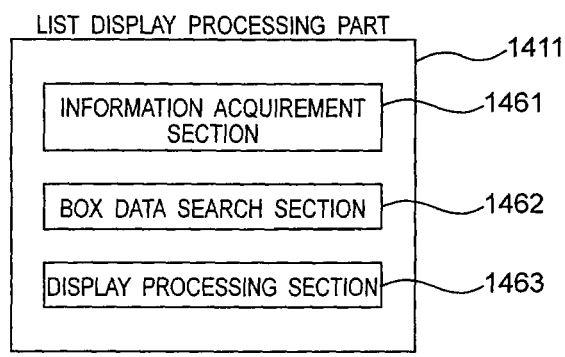
FIG. 5 is a block diagram showing the constitution of the list display processing part shown in FIG. 4.

Moreover, the list display processing part 1411 is a part for executing display of the list of the box data 20. As shown in FIG. 5, the list display processing part 1411 are divided by function into an information acquirement section 1461, a box data search section 1462 and a display processing section 1463. Here, the information acquirement section 1461 acquires an account of the user who uses the box data management apparatus 140, as well as pass information on the storage boxes 112, 122 and 132 present in the network 102. The box data search section 1462 searches a specific storage box 112 and the like from the devices 110, 120 and 130 based upon the user account and the pass information, and reads the box data 20 from the searched storage boxes and then stores them. In the information acquirement section 1461 and the box data search section 1462, storage related information 1601 shown in FIG. 1 is created which shows a relation between the box data 20 and original storage devices (e.g. the first 1 MFP 110 etc.) for the box data. The original storage device is a device which is storing the box data 20 read by the box data search section 1462. Based upon the storage related information 1601, the display processing section 1463 displays a list of the box data 20 without division by the devices and the storage boxes in the above-described manner.

Figure 6:
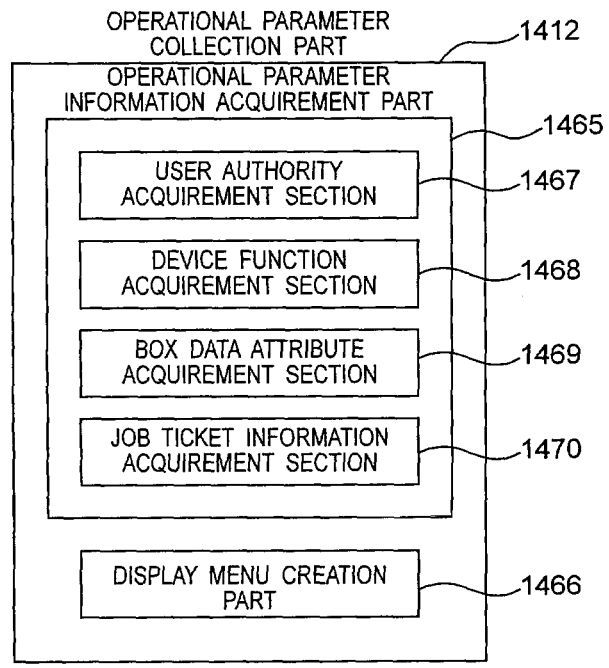
FIG. 6 is a block diagram showing the constitution of the operational parameter collection part shown in FIG. 4.

The operational parameter collection part 1412 is a part which collects operational parameters showing functions for processing the box data 20 in the devices 110, 120 and 130. As shown in FIG. 6, the operational parameter collection part 1412 is divided by function into an operational parameter information acquirement part 1465 and a display menu creation part 1466.

Figure 15:
FIG. 15 is a view showing job ticket and setting information to be used in the box data management apparatus shown in FIG. 1.

The operational parameter information acquirement part 1465 is divided by function into a user authority acquirement section 1467, a device function acquirement section 1468, a box data attribute acquirement section 1469 and a job ticket information acquirement section 1470. In the operational parameter information acquirement part 1465, user authority information 1602 shown in FIG. 12 is acquired by the user authority acquirement section 1467, device function information 1603 shown in FIG. 13 is acquired by the device function acquirement section 1468, box data attribute part 1604 shown in FIG. 14 is acquired by the box data attribute acquirement section 1469, and job ticket and setting information 1605 shown in FIG. 15 is acquired by the job ticket information acquirement section 1470. In the present embodiment, the above-mentioned operational parameter corresponds to function created based upon the user authority information 1602, the device function information 1603, the box data attribute information 1604, and the job ticket and setting information 1605, respectively. It is to be noted that, hereinafter, those operational parameters may be generically referred to as "operational parameters 1610"

Here, the user authority information 1602 is information which shows what authority the user has over each of the devices 110, 120 and 130 present on the network. For example, in the present embodiment, the user has authorities over the first MFP 110 for copying, printing, fax transmission, image data reading by scanning and e-mail distribution, as shown in FIG. 12. The device function information 1603 is information which shows functions of the devices 110, 120 and 130. For example, in the present embodiment, as shown in FIG. 13, the first MFP 110 has functions of black-and-white printing, color printing, fax transmission, direct printing of an PDF/JPEG image, and e-mail distribution, whereas the PC 130 does not have such functions. The box data attribute information 1604 is information which shows attributes and histories in use of the box data 20. In the present embodiment, the above-mentioned attributes for example correspond to original storage devices for the box data, kinds, color information, and multi-valued/binary information of the box data, and the like. As shown in FIG. 14, with regard to the box data 2 for example, the original storage device is the first MFP 110, and the data is printing data, color data, and multi-valued data. The job ticket and setting information 1605 corresponds to information in a job ticket in each of the devices 110, 120 and 130, and further, setting information set by the user. The information in the job ticket is information on processing for printing of the box data 20, e.g. setting information such as a color and thickness of print paper and an instruction to print one side or both sides of paper. The setting information set by the user for example corresponds to information for one-touch key, with which data can be transmitted by one-button operation after storage of a fax destination.

Figure 18:
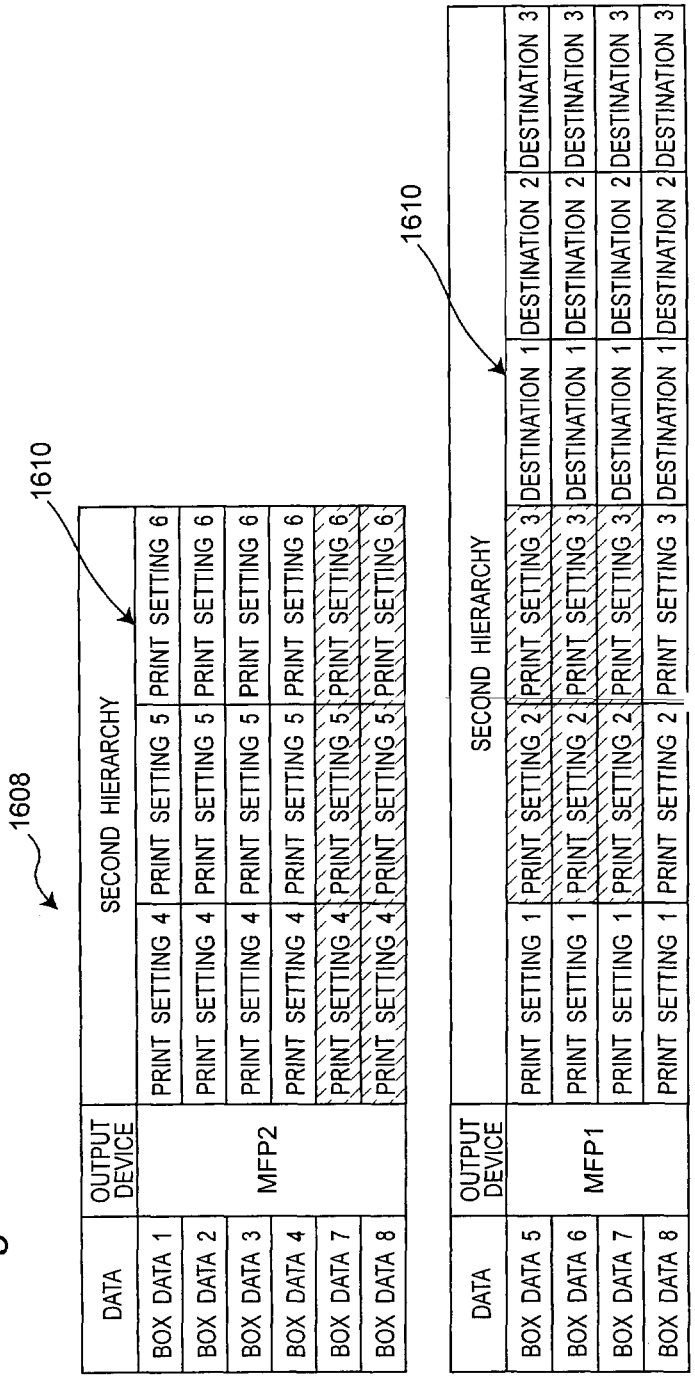
FIG. 18 is a view showing second hierarchical information to be used in the box data management apparatus in FIG. 1.

The display menu creation part 1466 creates the operational parameters 1610 for each of the box data based upon each of the collected information 1601 to 1605. Specifically, first hierarchal information 1607 shown in FIG. 17 and second hierarchal information 1608 shown in FIG. 18 are created. Here, the first hierarchal information 1607 is information created by extracting operational parameters 1610 that are selectable in a case that each of the box data 20 is processed in an original storage device for the box data. The second hierarchal information 1608 is information created by extracting operational parameters 1610 that are selectable in a case that each of the box data 20 is processed in a different device from the original storage device for the box data.

In the first hierarchal information 1607, "Print setting 2" and "Print setting 3" are setting items to be made with regard to color printing, and thus cannot be made on the box data 3 and the box data 4 which are black-and-white data, based upon the box data attribute information 1604 shown in FIG. 14. Therefore, as shown in FIG. 17, the box data 3 and the box data 4 are displayed in a manner different from the other parts, for example by being grayed out, so as to display impossibility to make the setting on those data. It is to be noted that in FIGS. 17 and 18, the grayed-out parts are displayed by hatching.

In the second hierarchal information 1608, since the second MFP 120 does not have a JPEG/PDF direct print function based upon the device function information 1603 shown in FIG. 13, the box data 7 and the box data 8 which are data of the JPEG and/or PDF cannot be printed. Hence, with regard to the box data 7 and the box data 8, "Print setting 4", "Print setting 5" and "Print setting 6" are displayed by being grayed out as described above. Moreover, since "Print setting 2" and "Print setting 3" are setting items to be made for color printing as thus described, with regard to the box data 5, the box data 6 and the box data 7 which are black-and-white data, "Print setting 2" and "Print setting 3" parts are displayed by being grayed out as described above.

Figure 7:
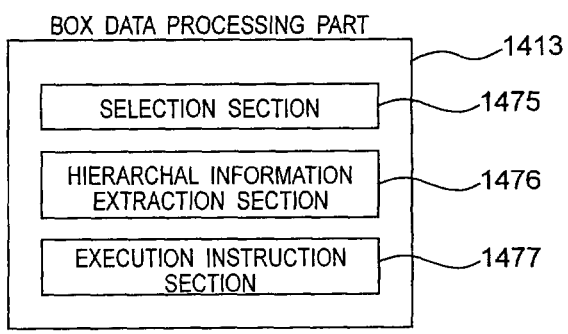
FIG. 7 is a block diagram showing the constitution of the box data processing part shown in FIG. 4.

The box data processing part 1413 is a part which extracts the device(s) and the operational parameter(s) 1610 which are capable of processing the selected box data 20, based upon the first hierarchal information 1607 and the second hierarchal information 1608, to enable display of those device(s) and parameter(s), and further instructs execution of the selected operational parameter(s) 1610. As shown in FIG. 7, the box data processing part 1413 is divided by function into a selection section 1475, a hierarchal information extraction section 1476 and an execution instruction section 1477.

The selection section 1475 is a part which enables selection of one or a plurality of desired box data from the box data 20 displayed in the list as thus described, and further a part which selectably displays the devices 110, 120 and 130, capable of processing the box data 20 displayed in the list, based upon the storage related information 1601.

The hierarchal information extraction section 1476 is a part which extracts the operational parameters for the selected box data and displays the extracted parameters.

The hierarchal information extraction section 1476 is further a part which, when a plurality of box data 20 are selected, extracts operational parameter(s) common among the operational parameters extracted from the plurality of box data and displays the extracted common parameter(s).

The execution instruction section 1477 is a part which makes a device(s) execute processing on the box data 20 in accordance with the selected operational parameters selected from the operational parameters extracted and displayed by the hierarchal information extraction section 1476.

Figure 8:
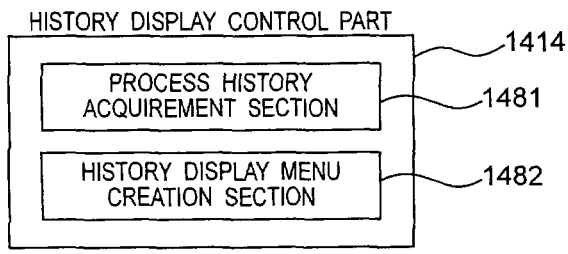
FIG. 8 is a block diagram showing the constitution of the history display control part shown in FIG. 4.

Further, the history display control part 1414 is a part which acquires processing history information showing processing histories of the box data in each of the devices 110, 120 and 130, and then controls display of the operational parameter(s) based upon the acquired processing history information. As shown in FIG. 8, the history display control part 1414 is divided by function into a processing history acquirement section 1481 and a history display menu creation section 1482. The processing history acquirement section 1481 acquires processing history information 1606 shown in FIG. 16. The processing history information 1606 is information showing how many times and in which of the devices 110, 120 and 130 each of the box data 20 has been processed in the past. As shown in FIG. 16, for example in the box data 3, e-mail distribution processing was executed by the first MFP 110 ten times.

The history display menu creation section 1482 controls the order of display of the operational parameters 1610 based upon the processing history information 1606.

Figure 9:
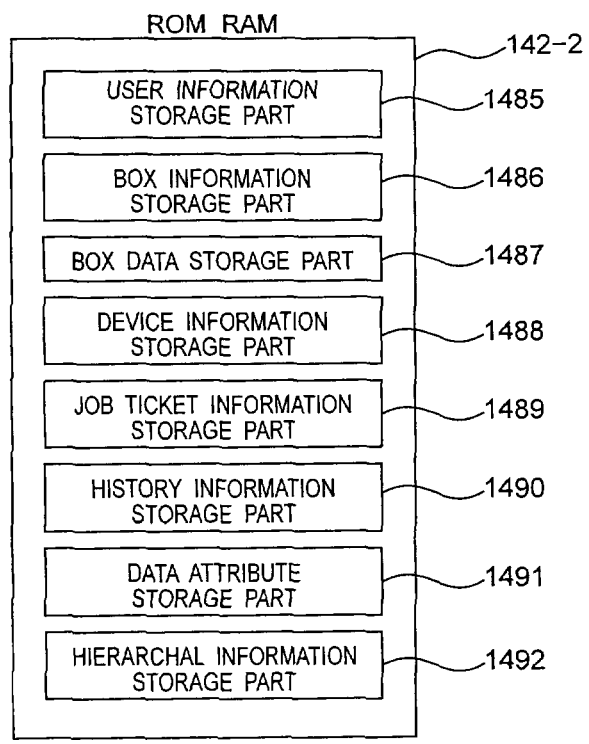
FIG. 9 is a block diagram showing the constitution of the ROM/RAM part shown in FIG. 3.

As shown in FIG. 9, the ROM/RAM part 142-2 is divided by function into a user information storage part 1485, a box information storage part 1486, a box data storage part 1487, a device information storage part 1488, a job ticket information storage part 1489, a history information storage part 1490, a data attribute storage part 1491 and a hierarchal information storage part 1492.

An operating system (OS) and a box data management program 1421 as a program for executing the box data management method are stored into the hard disc 142-1. It is to be noted that the box data management program 1421 may be previously stored into the hard disc 142-1, or may be installed from a record medium 1431 such as CD-ROM to the hard disc 142-1 via the drive 143-2 for record medium, or further via the network I/F 145.

Below described is the operation of the box data management apparatus 140 in the data processing system 101 including the box data management apparatus 140 constituted as described above, namely a box data management method. It should be noted that in practice, the box data management method is executed by the control unit 141 of the box data management apparatus 140 in accordance with the box data management program 1421 stored in the hard disc 142-1.

Figure 19:
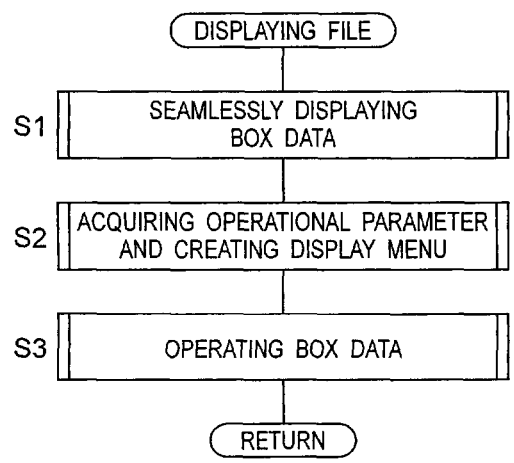
FIG. 19 is a flowchart schematically showing a box data management method to be executed with the box data management apparatus shown in FIG. 1.

As shown in FIG. 19, the box data management method is broadly divided into a step of displaying the box data 20 in a list (step S1), a step of acquiring the operational parameters 1610 to create a display menu (step S2), and a step of executing processing on the box data 20 (step S3).

Figure 20:
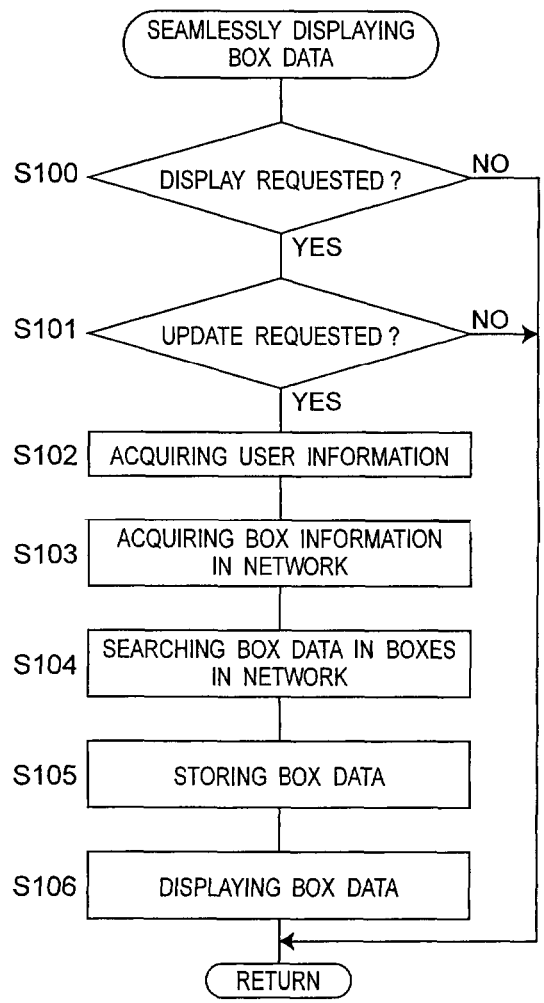
FIG. 20 is a flowchart explaining an operation of seamlessly displaying box data shown in FIG. 19.

First, the step S1 is described with reference to FIG. 20.

In a step S100, the presence or absence of a request from the user for displaying a list of the box data 20 is determined. When there is the request, in a step S101, the presence or absence of a request from the user or the system for updating the display of the list is determined. It is to be noted that the update request includes the first request for displaying the list of the box data 20. When there is the update request, the process goes to a step S102.

Figure 23:
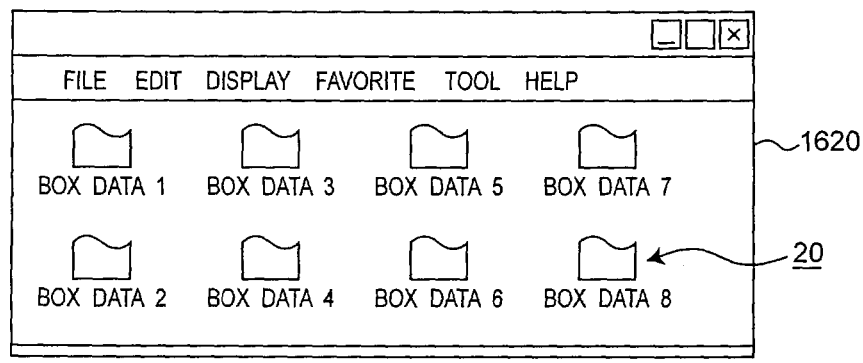
FIG. 23 is a view showing a state where box data are displayed in a list by the operation of seamlessly displaying box data shown in FIG. 19.

In the step S102, the account of the user is acquired by the information acquirement section 1461. The acquired user account is stored into the user information storage part 1485 in the ROM/RAM part 142-2. In a next step S103, pass information of the storage boxes 112, 122 and 132 present in the network 102 are acquired by the information acquirement section 1461. The pass information is stored into the box information storage part 1486 in the ROM/RAM part 142-2. In a next step S104, by the box data search section 1462, a specific storage box 112 and the like are searched based upon the acquired user account and pass information, and then the box data 20 are read from the searched storage box. In a next step S105, the read box data 20 are stored into the box data storage part 1487 in the ROM/RAM part 142-2. As thus described, the storage related information 1601 shown in FIG. 1 is formed by the information acquirement section 1461 and the box data search section 1462. In a next step S106, the read box data 20 are displayed in a list based upon the storage related information 1601, without division by the devices and the storage boxes, for example as on a screen 1620 shown in FIG. 23.

Figure 21:
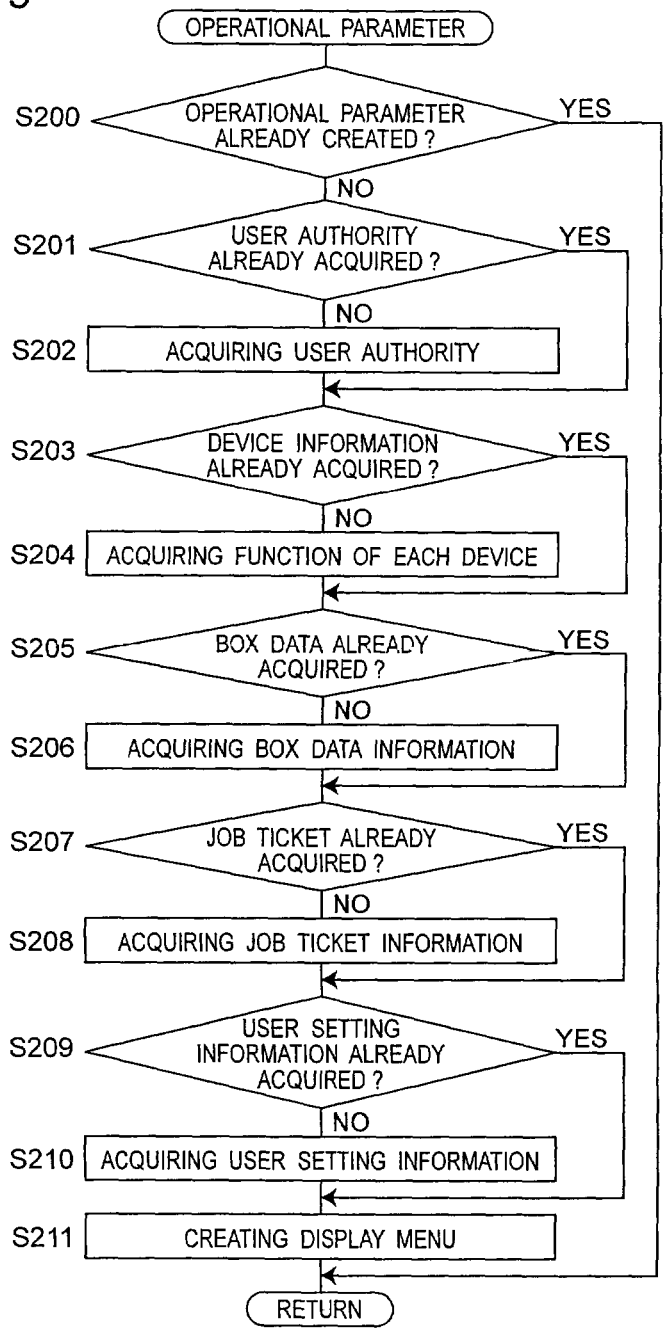
FIG. 21 is a flowchart explaining an operation of acquiring and displaying operational parameters shown in FIG. 19.

Next, the step S2 is described with reference to FIG. 21.

In a step S200, it is determined whether or not the operational parameters 1610 for the box data 20 displayed in the list in the step S106 are already created. When the operational parameters 1610 are already created, the process is completed. On the other hand, when the operational parameters 1610 are not created or there are the box data 20 for which the operational parameters 1610 are not created, the foregoing user authority information 1602 is acquired, with reference to FIG. 12, by the user authority acquirement section 1467 in steps S201 and S202. The acquired user authority information 1602 is stored into the user information storage part 1485 in the ROM/RAM part 142-2 in the form of a table as shown in FIG. 12. In next steps S203 and S204, the foregoing device function information 1603 is acquired by the device function acquirement section 1468 with reference to FIG. 13. The acquired device function information 1603 is stored into the device information storage part 1488 in the ROM/RAM part 142-2 in the form of a table as shown in FIG. 13. In next steps S205 and S206, the foregoing box data attribute information 1604 is acquired by the box data attribute acquirement section 1469 with reference to FIG. 14. The acquired box data attribute information 1604 is stored into the data attribute storage part 1491 in the ROM/RAM part 142-2 in the form of a table as shown in FIG. 14. In steps S207 to S210, the foregoing job ticket and the setting information 1605 is acquired by the job ticket information acquirement section 1470 with reference to FIG. 15. The acquired job ticket and setting information 1605 is stored into the job ticket information storage part 1489 in the ROM/RAM part 142-2 in the form of a table as shown in FIG. 15.

In a step S211, based upon the above collected various information, the display menu creation part 1466 creates the first hierarchal information 1607, and further, the second hierarchal information 1608. The created hierarchal information 1607 and 1608 are stored into the hierarchal information storage part 1492 in the ROM/RAM part 142-2, in the form of a table as shown in FIGS. 17 and 18, respectively. It should be noted that, although there are two hierarchies in the present embodiment as thus described, a deeper hierarchy of information can also be created.

Figure 22:
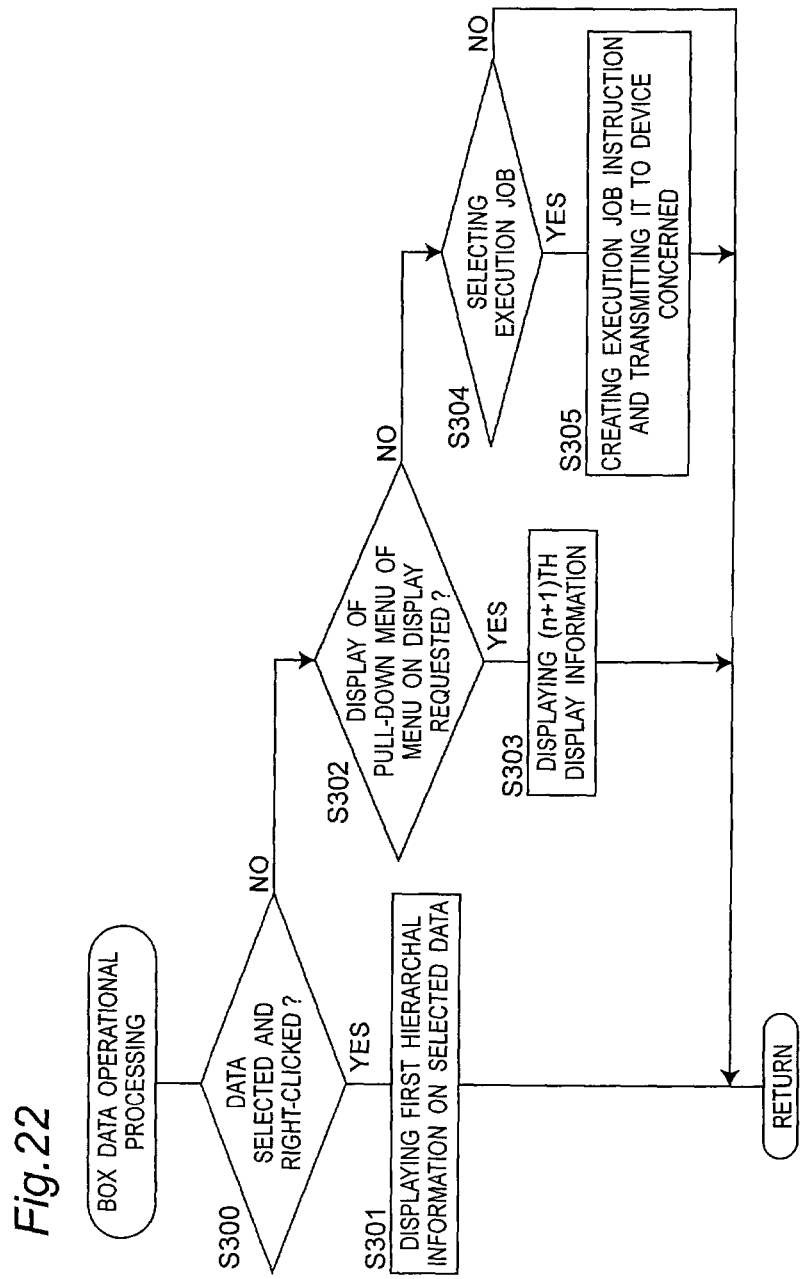
FIG. 22 is a flowchart explaining an operation of operational processing on box data shown in FIG. 19.

Next, the step S3 is described with reference to FIG. 22.

Figure 24:
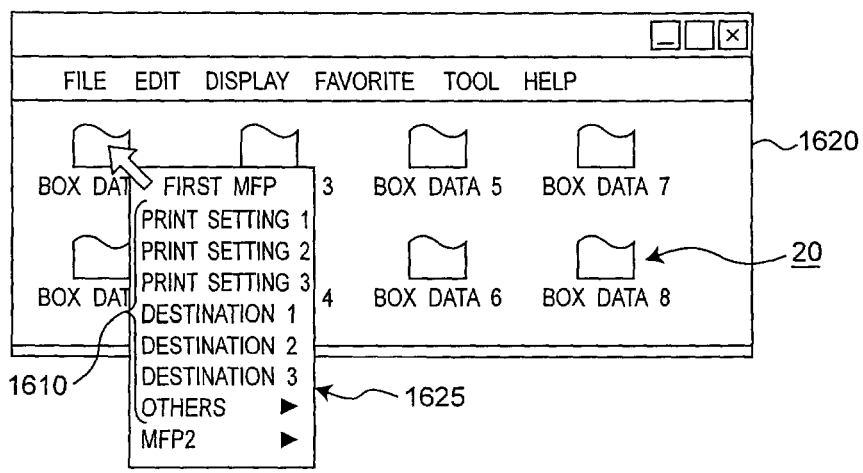
FIG. 24 is a view showing a state where first hierarchal operational parameters are further displayed in the displayed state shown in FIG. 23.

In a step S300, on the screen 1620 of the display 144 where the list of the box data 20, created in the step S1, is displayed, box data which the user demands to process is selected by the selection section 1475. Specifically, the user selects the desired box data with the use of the mouse 143-1. A case is assumed in which the box data 1 is selected as shown in FIG. 24. After the selection, it is determined whether or not the box data 1 as the selected box data is so called right-clicked with the mouse 143-1. With the data right-clicked, at a step S301, the operational parameters 1610 with respect to the selected box data, i.e. the box data 1 in the present embodiment, are extracted by the hierarchal information extraction section 1476, based upon the first hierarchal information 1607 shown in FIG. 17, and the extracted parameters are then displayed. As shown in FIG. 17, with regard to the box data 1, an original storage device is the first MFP 110, and executable processing are "Print settings 1 to 3" and "Destinations 1 to 3". Therefore, as shown in FIG. 24, a menu 1625 is displayed which has the operational parameters 1610 of above-described "Print settings 1 to 3" and "Destinations 1 to 3". In the display menu 1625, the original storage device for the box data 1 is displayed in such a manner as to be understood by the user. Since the original storage device for the box data 1 is the first MFP 110 as described above, the letters of the "First MFP" are displayed with a different color from a color of the different parts in the present embodiment.

Details of the display based upon the first hierarchal information 1607 are information on the usable job ticket and one touch key based upon the various information acquired in the foregoing step S2.

In the display menu 1625, a device which is capable of processing the selected box data and other than the original storage device for the selected data box is also displayed based upon the first hierarchal information 1607. Namely, in the present example, the device "MFP 2", capable of processing the box data 1, is also displayed. When the box data 1 is right-clicked in the step S300, and the user selects the operational parameter 1610 of "MFP2" in a step S302, the selected box data, the operational parameters 1610 for the box data 1 in the present embodiment, are extracted by the hierarchal information extraction section 1476 based upon the second hierarchal information 1608 shown in FIG. 18, and the extracted data are then displayed in a step S303. Specifically, "Print setting 4", "Print setting 5" and "Print setting 6" are displayed. It should be noted that a view of a state in which the operational parameters 1610 for "MFP2" was selected is omitted in FIG. 24.

In a step S304, the operational parameters 1610 for the first hierarchal information 1607 or the second hierarchal information 1608 are selected. For example, by the selection of "Destination 1" in the first hierarchal information 1607, the box data 1 is transmitted by the execution instruction section 1477 to the selected operational parameters 1610, "Destination 1" in this example, in a step S305.

Figure 25:
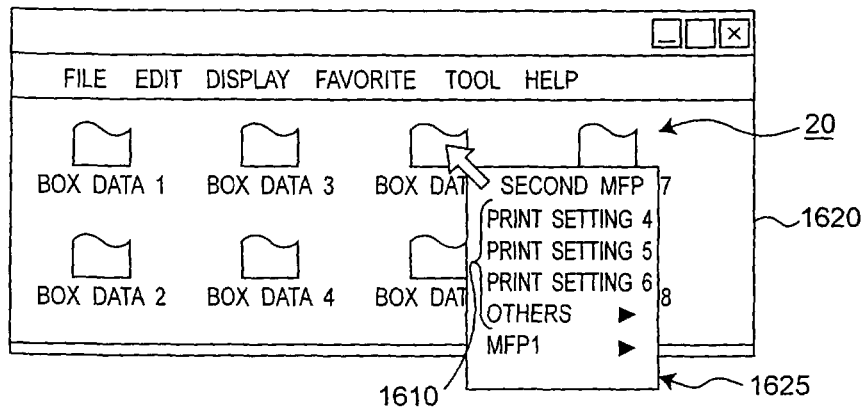
FIG. 25 is a view showing a state where first hierarchal operational parameters are further displayed in the displayed state shown in FIG. 23.
Figure 26:
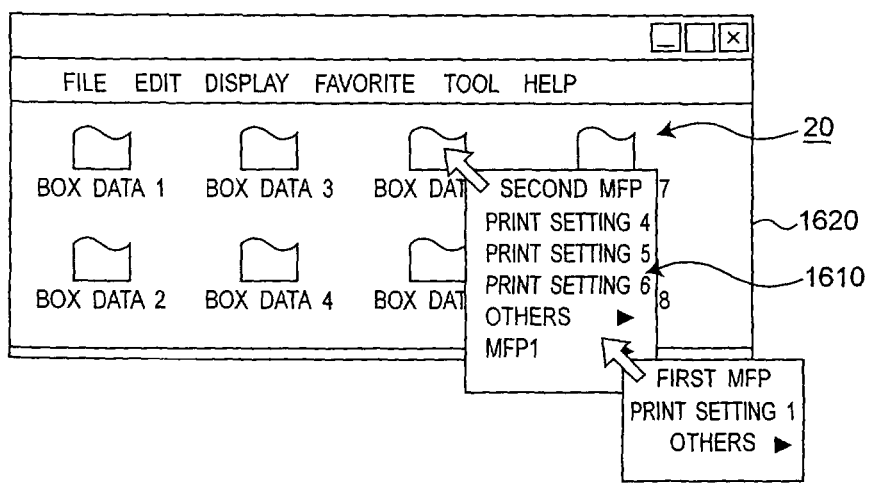
FIG. 26 is a view showing a state where second hierarchal operational parameters are further displayed in the displayed state shown in FIG. 23.

It should be noted that FIG. 25 shows the state of display of the operational parameters 1610 for the first hierarchal information 1607 in a case where box data 5 is selected. FIG. 26 shows a state of display of the operational parameters 1610 for the second hierarchal information 1608 after "MFP1" is selected in the state of FIG. 25.

Figure 27:
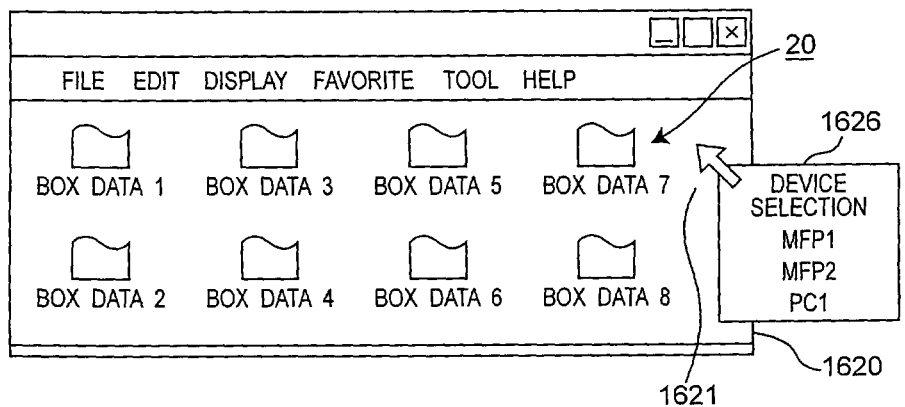
FIG. 27 is a view showing a state where first hierarchal operational parameters are further displayed in the displayed state shown in FIG. 23.
Figure 28:
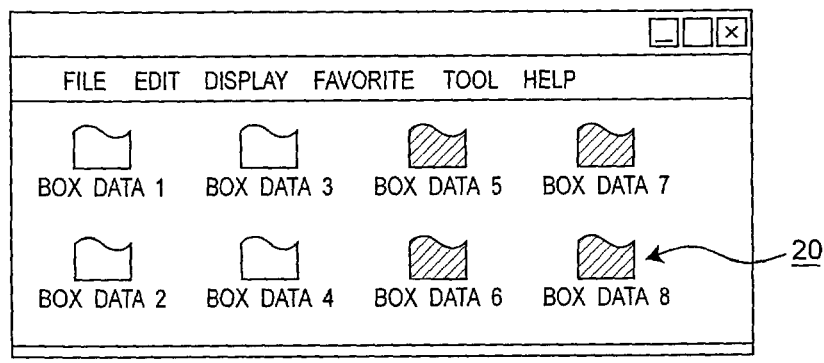
FIG. 28 is a view showing a state where the operational parameters shown in FIG. 27 is selected.

When the user right-clicks a display region 1621 which is a region other than the box data 20 on the screen 1620 of the display 144 displaying the list of the box data 20, as shown in FIG. 27, the device 110 and the like which are capable of processing the box data 20 displayed in the list are displayed as a display menu 1626 based upon the storage related information 1601 shown in FIG. 11, for example. On the display menu 1626, display is controlled such that processable box data and non-processable box data are clearly distinguished from one another in accordance with the device selected by the user. On the display menu 1626, when the user for example selects "MFP1 ", the box data 5 to 8 are displayed by being grayed out based upon the first hierarchal information 1607, as shown in FIG. 28, to indicate the impossibility for processing.

Next, a modified example of the foregoing box data management method is described below.

FIRST MODIFIED EXAMPLE

In the first modified example, the processing history of the box data 20 is considered when the operational parameters 1610 are displayed.

Figure 29:
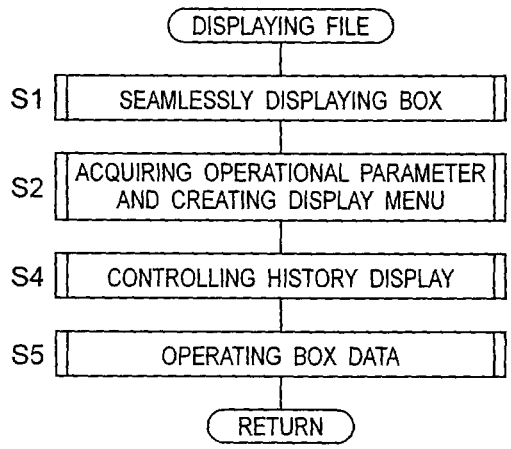
FIG. 29 is a flowchart schematically showing a modified example of the box data management method to be executed with the box data management apparatus shown in FIG. 1.

As shown in FIG. 29, in the present modified example, a step S4 is executed after the step S2, and further, a step S5 is executed in place of the step S3. It is to be noted that the steps S1 and S2 shown in FIG. 29 are the same steps as those described above, and the descriptions thereof are omitted here.

Figure 30:
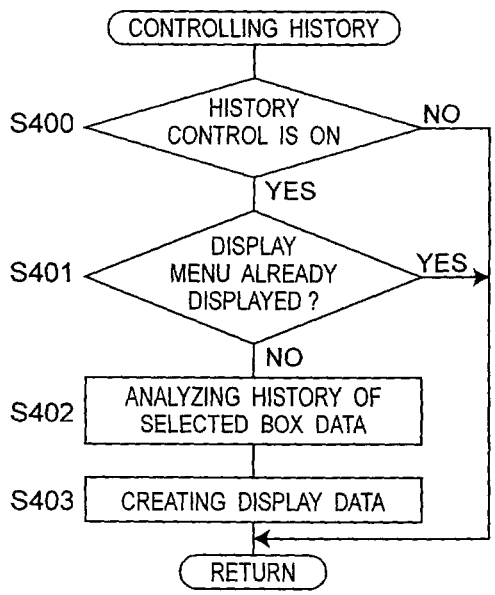
FIG. 30 is a flowchart explaining the history display control operation shown in FIG. 29.

The operation of the step S4 is described with reference to FIG. 30. In a step S400, it is determined whether or not history control is ON. Namely, as shown in FIG. 24 and the like, when the operational parameters 1610 are displayed, it is determined whether or not to display the operational parameters 1610 in consideration of the processing history information 1606 shown in FIG. 16, acquired by the processing history acquirement section 1481. When the history control is ON, in a next step S401, it is determined whether or not the display menu 1625 or 1626, created in the step S211, is on display on the screen. When the menu is not on display, a processing history of the selected box data is analyzed in a next step S402. Namely, a processing history is created for each of the box data 20 based upon the state of processing on each box data, and the processing history information 1606 shown in FIG. 16 is stored as table data in the hierarchal information storage part 1490 in the ROM/RAM part 142-2. The processing history information 1606 is read by the processing history acquirement section 1481 in the history display control part 1414. In a next step S403, a display menu is created by the history display menu creation section 1482 in the history display control part 1414 based upon the processing history information 1606 such that the operational parameters 1610 are displayed in the display menu of the selected box data, giving higher priority to an operation with a higher frequency in processing on the selected box data.

Figure 31:
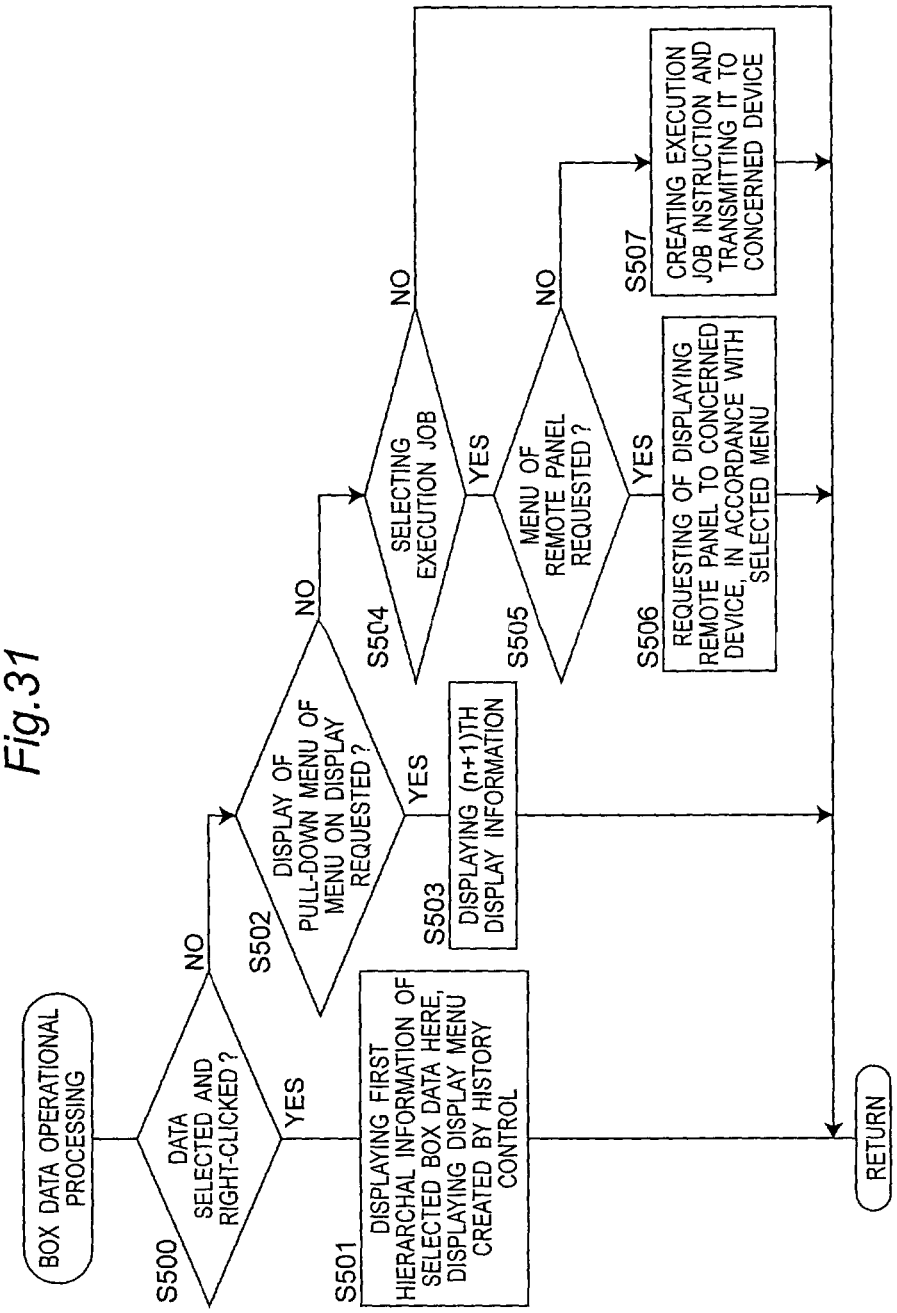
FIG. 31 is a flowchart explaining the operation of operational processing on box data shown in FIG. 29.
Figures 32, 33:
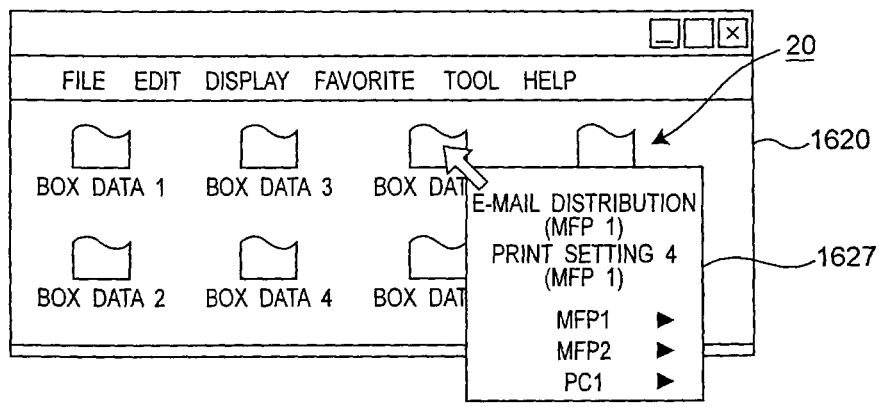
FIG. 32 is a view showing first hierarchal information to be used in the box data management apparatus in the case of executing the history display control shown in FIG. 30.
FIG. 33 is view showing one example of a remote panel which is further displayed when the operational parameter shown in FIG. 32 is selected.

Operation of the step S5 is described with reference to FIG. 31. In a step S500, as in the operation of the step S300, it is determined whether or not box data 20, requested by the user to be processed, is selected and right-clicked on the screen 1620 of the display 144 displaying the list of the box data 20. With the box data 20 right-clicked, in a step S501, the operational parameters 1610 in consideration of the processing history information 1606 are extracted based upon the first hierarchal information 1607, and then a display menu 1627 is displayed as shown in FIG. 32. Specifically, FIG. 32 shows a case in which the box data 5 is selected. According to the processing history information 1606 shown in FIG. 16, the order of the frequency in processing on the box data 5 is as follows: e-mail transmission with the first MFP 110 (ten times); and printing with the second MFP 120 (twice). Therefore, as shown in FIG. 32, the operational parameters 1610 are displayed in the display menu 1627 in such an order that "E-mail transmission" with a high processing frequency is displayed at the forefront, followed by "Print setting". It is preferable here that a device capable of executing each processing is displayed along with the processing.

For allowing execution of operations other than the "E-mail transmission" and "Print setting", pull-down menus of operations of devices capable of processing the selected box data are prepared.

As thus described, the display menu 1627, created in accordance with the first hierarchal information 1607 in consideration of the processing history information 1606, is displayed. When a request for displaying further lower hierarchal information is made in a step S502, a display menu is displayed based upon the second hierarchal information 1608 in a step S503.

In a step S504, the operational parameter 1610 in the first hierarchal information 1607 or the second hierarchal information 1608 is selected. After the selection, in a step S505, it is determined whether or not a remote panel needs to be called up. The remote panel is a display corresponding to details of the operational panel for each of the devices 110, 120 and 130. For example, the menu of "E-mail distribution" in the display menu 1627 is set so as to call up the remote panel. Therefore, when the user selects the operational parameter 1610 to which "Calling up a remote panel" is set, a display of the remote panel is requested to a concerned device(s) at a step S506. The remote panel is then displayed in another window. Specifically, when the user selects "E-mail distribution", the remote panel 1628, one example of which is shown in FIG. 33, is displayed in another window. The remote panel 1628 displays details corresponding to details of the e-mail distribution in the operational panel of the first MFP 110 which executes the "E-mail distribution". In a step S507, the user selects processing to be executed on the remote panel 1628.

THE SECOND MODIFIED EXAMPLE

In the second modified example, a plurality of box data can be selected from the box data 20 displayed in the list.

Figure 34:
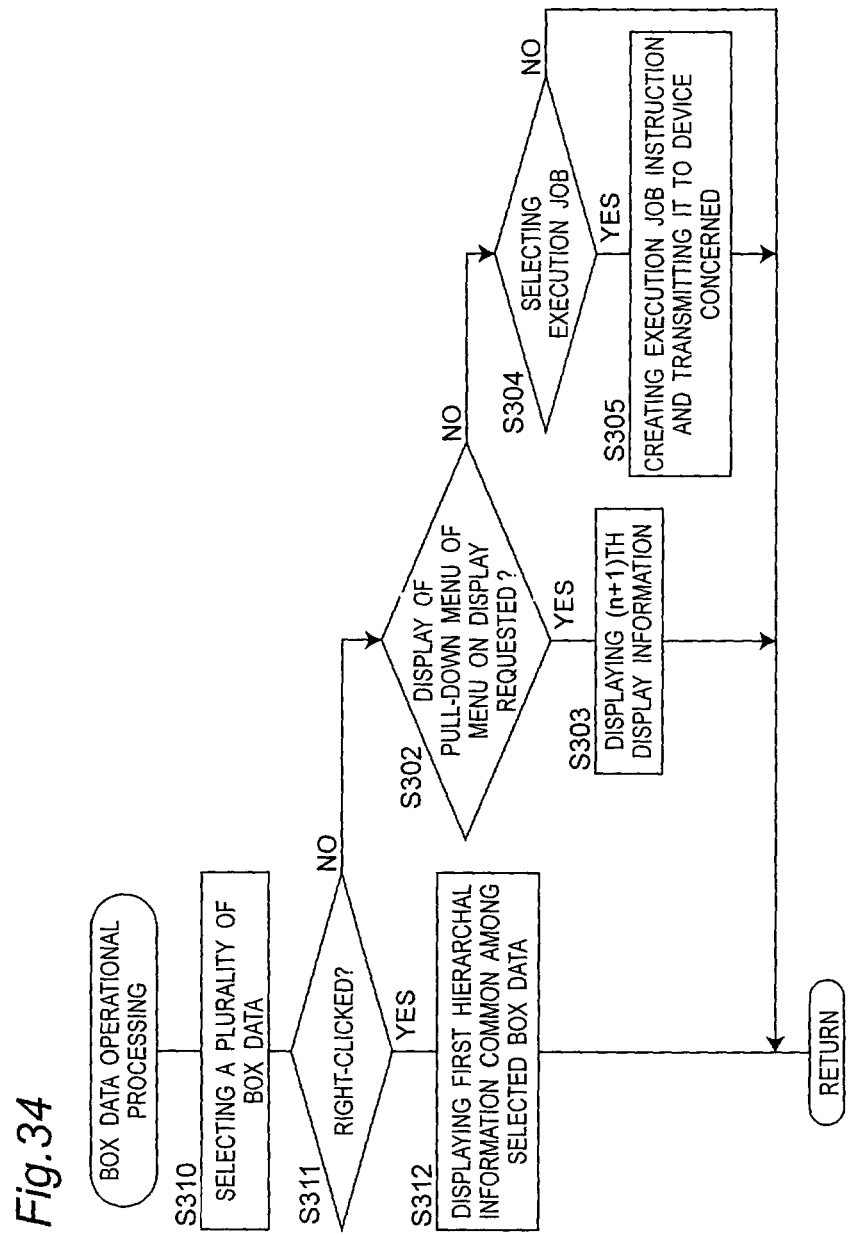
FIG. 34 is a flowchart explaining another modified example of the box data management method to be executed with the box data management apparatus shown in FIG. 1.

As described with reference to FIG. 22, in the foregoing embodiment, one box data is selected from the box data displayed in the list. On the other hand, in the second modified example, a plurality of box data can be selected by the selection section 1475 from the box data displayed in the list in a step S310, as shown in FIG. 34. In practice, the user selects a plurality of box data with the use of the mouse 143-1. In a next step S311 corresponding to the foregoing step S300, it is determined whether or not selected plurality of box data are right-clicked. In a next step S312, processing function(s) common among the selected plurality of box data is extracted by the hierarchal information extraction section 1476, and the extracted function(s) is displayed.

The operations of the steps S302 to S305 as other operations correspond to the respective operations described with reference to FIG. 22.

Figure 35:
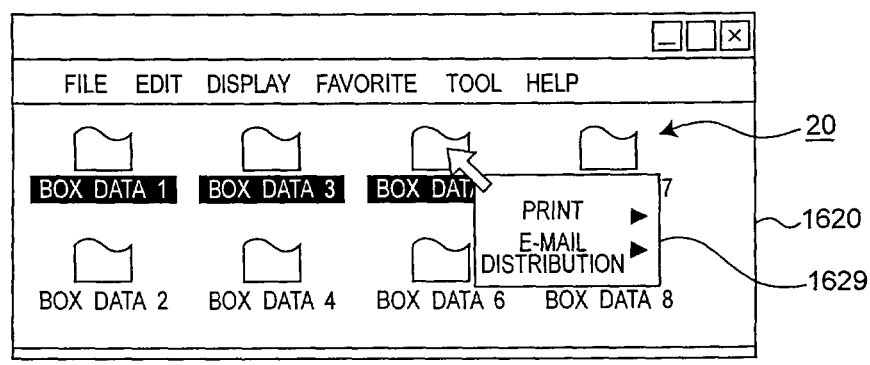
FIG. 35 is a view showing a state where a plurality of box data are selected and operational parameters are displayed in the modified example shown in FIG. 34.
Figure 36:
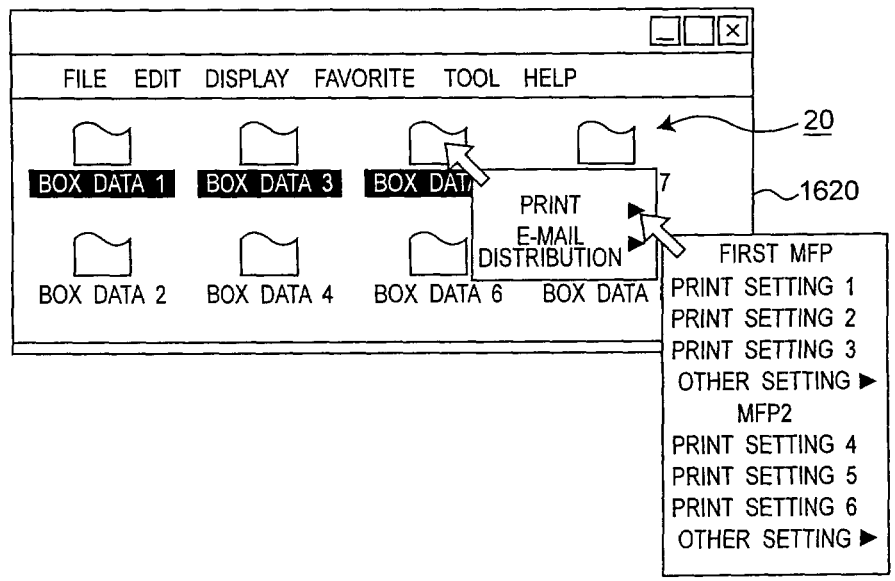
FIG. 36 is a view showing a state where the operational parameter is further selected and second hierarchal information is displayed in the state shown in FIG. 35.

Specifically, a case is assumed in which the box data 1, the box data 3 and the box data 5 are simultaneously selected from the displayed list as shown in FIG. 35. The device capable for processing the box data 1 and 3 is the first MFP 110 and the device capable for processing the box data 5 is the second MFP 120, in accordance with the foregoing operations of acquiring the operational parameters described with reference to FIG. 21 as well as the various information shown in FIGS. 11 to 16. The functions common between these devices 110 and 120 are printing, faxing and e-mail distribution. However, the faxing function cannot be used in the second MPF 120 according to the user authority information 1602. Therefore, the processing functions common among the box data 1, 3 and 5 are printing and e-mail distribution. Accordingly, as shown in FIG. 35, a display menu 1629 displaying the operational parameters 1610 for "Printing" and "E-mail distribution" is displayed with respect to the selected box data. Further, by selection of a pull-down menu of "Printing", processing menus for the first MFP 110 and the second MFP 120 are displayed as shown in FIG. 36.

It is also possible in the second modified example to consider the foregoing processing history information 1606. Since the processing function common among the selected box data of the box data 1, 3 and 5 is e-mail distribution in consideration of the processing history information 1606, it is also possible to preferentially display the operational parameters 1610 for "E-mail distribution" in the display menu 1629.

The present invention is applicable to an image data management apparatus and method which manage image data including a document in a constitution where a plurality of devices for handling the image data, such as multi-functional peripherals (MFP) and a printer, are connected via a network.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A box data management apparatus which extracts box data from a plurality of devices having storage boxes, each of which stores the box data and is connected to a network, and including a display screen which displays a list of the box data without dividing the extracted box data on a basis of the plurality of devices and the storage boxes, the box data management apparatus comprising:
   a processing unit that controls operations of the box data management apparatus;
   an operational parameter collection part configured to collect from the box data extracted from the plurality of devices operational parameters which correspond to information for processing the box data in the plurality of devices; and
   a box data processing part including a user selection section configured to enable a user to select a desired box data from the box data displayed in the list, and an extraction section configured to extract and display the operational parameters for the selected desired box data, the box data processing part operable to automatically select multiple devices from among the plurality of devices which are capable of processing the selected desired box data according to the extracted operational parameters, and the box data processing part configured to display in a same list the selected multiple devices and operational parameters on a display menu so that the selected multiple devices and the operational parameters are selectable from the display menu by a user.

2. The box data management apparatus according to claim 1, further comprising a display processing part configured to have an information acquirement section and a box data search section which are configured to acquire storage related information showing a relation between the box data and an original storage device which is the device storing the concerned box data, and the display processing part configured to display the list of the box data.

3. The box data management apparatus according to claim 2, wherein the box data processing part further has an execution instruction section configured to make the device execute processing on the desired selected box data in accordance with an operational parameter selected from the operational parameters extracted and displayed by the extraction section.

4. The box data management apparatus according to claim 1, further comprising a history display control part configured to acquire processing history information which shows a processing history of the box data for each of the plurality of devices, and control display of the operational parameters based upon the processing history information.

5. The box data management apparatus according to claim 2, wherein the selection section further selectably displays the devices which are capable of processing the box data displayed in the list according to the storage related information, and by selection from the devices capable of processing the box data displayed in the list on a basis of the storage related information, the box data processing part displays box data which can be processed by a selected device in a different manner from the other box data displayed in the list.

6. The box data management apparatus according to claim 2, wherein the selection section is capable of selecting a plurality of box data from the box data displayed in the list, and the extraction section extracts and displays an operational parameter common among the operational parameters extracted from the plurality of box data.

7. The box data management apparatus according to claim 1, wherein the operational parameter collection part collects: user authority information showing authority of the user over the plurality of devices; device function information showing functions of the plurality of devices; box data attribute information showing attributes of the box data; and job ticket information of the plurality of devices.

8. A box data management method, comprising:
extracting box data from a plurality of devices having storage boxes each of which stores the box data;
displaying a list of the extracted box data without dividing the extracted box data on a basis of the devices and the storage boxes;
collecting from the list of the extracted box data operational parameters which correspond to information for processing the extracted box data;
enabling a user to select desired box data from the extracted box data displayed in the list of the extracted box data;
extracting and displaying the operational parameters for the selected desired box data;
automatically selecting multiple devices from among the plurality of devices which are capable of processing the selected desired box data according to the extracted operational parameters; and
displaying the selected operational parameters and the selected multiple devices on a same selectable list so that the displayed selected operational parameters and the displayed selected multiple devices are further selectable from the list by a user.

9. The box data management method according to claim 8, wherein the selected desired box data which is able to be processed by a device selected from displayed devices is displayed in a different manner from the other box data in the displayed list of the box data.

10. The box data management method according to claim 8, wherein the extracted operational parameters for the box data are hierarchically displayed.

11. The box data management method according to claim 10, wherein a processing history of the box data is acquired for each of the selected devices, and order of display of the operational parameters to be displayed is controlled in accordance with frequency in use of the operational parameters based upon the processing history.

12. The box data management method according to claim 10, wherein upon selection of a plurality of box data from the box data displayed in the list, an operational parameter common among the selected plurality of box data is displayed.

13. The box data management method according to claim 10, wherein the selected device is made to execute an operational parameter selected from the displayed operational parameters.

14. The box data management apparatus according to claim 1, wherein the selected devices and operational parameters appearing on the display are further selectable by a user.

15. The box data management apparatus according to claim 1, wherein each of the selected multiple devices displayed in the display menu has an expandable and collapsible list of respective operational parameters that are selectable.

16. The box data management method according to claim 8, wherein each of the displayed selected multiple devices has an expandable and collapsible list of respective operational parameters that are selectable.

* * * * *